United States Patent
Yang et al.

(10) Patent No.: US 10,381,934 B2
(45) Date of Patent: Aug. 13, 2019

(54) MULTIPLE PARALLEL-CONNECTED RESONANT CONVERTER, INDUCTOR-INTEGRATED MAGNETIC ELEMENT AND TRANSFORMER-INTEGRATED MAGNETIC ELEMENT

(71) Applicant: Delta Electronics (Shanghai) CO., LTD, Shanghai (CN)

(72) Inventors: Haijun Yang, Shanghai (CN); Zengyi Lu, Shanghai (CN); Weilong Xia, Shanghai (CN); Yajiang Yan, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/414,702

(22) Filed: Jan. 25, 2017

(65) Prior Publication Data

US 2017/0214330 A1    Jul. 27, 2017

(30) Foreign Application Priority Data

Jan. 25, 2016 (CN) .......................... 2016 1 0049254

(51) Int. Cl.
*H02M 3/335* (2006.01)
*H01F 27/24* (2006.01)
(Continued)

(52) U.S. Cl.
CPC ........ *H02M 3/33523* (2013.01); *H01F 27/24* (2013.01); *H01F 27/255* (2013.01);
(Continued)

(58) Field of Classification Search
CPC .. H02M 3/285; H02M 3/335; H02M 3/33523; H02M 3/33569; H02M 3/337;
(Continued)

(56) References Cited

U.S. PATENT DOCUMENTS 9,406,419 B2 * 8/2016 Njiende T ................. H01F 3/10
2004/0036569 A1 2/2004 Tsai et al.
(Continued)

FOREIGN PATENT DOCUMENTS

CN    201465705 U    5/2010
CN    102064004 A    5/2011
(Continued)

OTHER PUBLICATIONS

The Chinese 10A issued by CNIPA dated Sep. 4, 2018.

*Primary Examiner* — Fred E Finch, III
(74) *Attorney, Agent, or Firm* — Yunling Ren

(57) ABSTRACT

A multiple parallel-connected resonant converter, an inductor-integrated magnetic element and a transformer-integrated magnetic element are provided. The multiple parallel-connected resonant converter includes a first and a second converters. The first converter having a first input and output end includes a first inductor, a first transformer and a first capacitor connected in series. The second converter having a second input and output end includes a second inductor, a second transformer and a second capacitor connected in series. The second output end is connected with the first output end in parallel. The first and second inductor are integrated in a first magnetic element, the first magnetic element includes a first and second side column, and a first and second central column. The first inductor includes a first coil positioned around the first central column and the second inductor includes a second coil positioned around the second central column.

6 Claims, 8 Drawing Sheets

(51) Int. Cl.
  *H01F 27/28* (2006.01)
  *H02M 3/28* (2006.01)
  *H02M 3/337* (2006.01)
  *H01F 27/255* (2006.01)
  *H01F 37/00* (2006.01)
  *H02M 1/00* (2006.01)

(52) U.S. Cl.
  CPC ......... *H01F 27/2823* (2013.01); *H01F 37/00* (2013.01); *H02M 3/285* (2013.01); *H02M 3/337* (2013.01); H02M 2001/0058 (2013.01); Y02B 70/1433 (2013.01); Y02B 70/1491 (2013.01); Y02P 80/112 (2015.11)

(58) Field of Classification Search
  CPC .... H02M 7/003; Y02B 70/1433; H01F 27/00; H01F 27/24; H01F 27/2823
  See application file for complete search history.

(56) References Cited

U.S. PATENT DOCUMENTS

| | | | | |
|---|---|---|---|---|
| 2009/0231887 | A1* | 9/2009 | Ye | H02M 3/33569 363/21.02 |
| 2012/0081204 | A1* | 4/2012 | Garrity | H01F 27/2847 336/221 |
| 2013/0083575 | A1* | 4/2013 | Kippley | H02M 3/285 363/64 |
| 2014/0043127 | A1* | 2/2014 | Worek | H01F 27/38 336/178 |
| 2014/0266530 | A1 | 9/2014 | Andres et al. | |
| 2015/0155089 | A1* | 6/2015 | Lu | H02M 3/335 363/16 |
| 2015/0180350 | A1* | 6/2015 | Huang | H02J 7/0068 307/66 |
| 2015/0302968 | A1* | 10/2015 | Lin | H01F 3/14 336/83 |
| 2016/0016479 | A1* | 1/2016 | Khaligh | B60L 11/1812 363/17 |
| 2016/0254756 | A1* | 9/2016 | Yang | H01F 30/12 363/21.02 |
| 2017/0011830 | A1* | 1/2017 | Lu | H01F 3/10 |
| 2017/0054378 | A1* | 2/2017 | Njiende T | H01F 27/2823 |
| 2018/0061560 | A1* | 3/2018 | Wukovits | H01F 27/24 |

FOREIGN PATENT DOCUMENTS

| | | |
|---|---|---|
| CN | 102074340 A | 5/2011 |
| CN | 103595367 A | 2/2014 |
| CN | 203721416 U | 7/2014 |
| JP | 5098888 B2 | 12/2012 |

\* cited by examiner

MULTIPLE PARALLEL-CONNECTED RESONANT CONVERTER, INDUCTOR-INTEGRATED MAGNETIC ELEMENT AND TRANSFORMER-INTEGRATED MAGNETIC ELEMENT

CROSS REFERENCE

This application is based upon and claims priority to Chinese Patent Application No. 201610049254.1, filed on Jan. 25, 2016, the entire contents thereof are incorporated herein by reference.

TECHNICAL FIELD

The present disclosure relates to a multiple parallel-connected resonant converter, an inductor-integrated magnetic element and a transformer-integrated magnetic element.

BACKGROUND

In high power supply application, two or multiple electrical branches connected in parallel are generally employed. In the parallel-connected converter, each branch may further contain magnetic elements, such as inductors or transformers. For example, the converter may use LLC circuit for high efficiency purpose and the magnetic elements may be used in the LLC resonant tank. For greater power, a large number of branches are used in the parallel-connected converter, thus leading to a large number of the magnetic elements and large volume, weight and loss of magnetic elements in the entire power supply. Therefore, how to reduce the number, volume, weight and loss of these magnetic elements becomes an important issue in developing a high power supply with high efficiency and high power density. In a parallel circuit, non-uniform of electrical parameters of the magnetic elements will result in uneven distribution of the power over branches of the circuit, and cause local over heat or high voltage/current stress on devices.

The above information disclosed in the background technology section is only used to facilitate understanding the background of the present disclosure, and thus it may include information which does not construct the prior art well-known by the person skilled in the related art.

SUMMARY

According to an aspect of the present disclosure, a multiple parallel-connected resonant converter is provided, the multiple parallel-connected resonant converter includes a first converter having a first input end and a first output end, wherein the first converter includes a first inductor, a first transformer and a first capacitor, and the first inductor, the first transformer and the first capacitor are connected in series to form a first resonant unit; and a second converter having a second input end and a second output end, wherein the second converter includes a second inductor, a second transformer and a second capacitor, the second inductor, the second transformer and the second capacitor are connected in series to form a second resonant unit, and the second output end is connected with the first output end in parallel. Wherein the first inductor and the second inductor are integrated in a first magnetic element, the first magnetic element includes a first side column, a second side column, a first central column and a second central column, the first inductor includes a first coil, the second inductor includes a second coil, the first coil is positioned around the first central column to form the first inductor, the second coil is positioned around the second central column to form the second inductor, and the first central column and the second central column have a same cross sectional area.

According to another aspect of the present disclosure, a multiple parallel-connected resonant converter is provided, the multiple parallel-connected resonant converter includes: a first converter having a first input end and a first output end, wherein the first converter includes a first inductor, a first transformer and a first capacitor, and the first inductor, the first transformer and the first capacitor are connected in series to form a first resonant unit; and a second converter having a second input end and a second output end, wherein the second converter includes a second inductor, a second transformer and a second capacitor, the second inductor, the second transformer and the second capacitor are connected in series to form a second resonant unit, and the second output end is connected with the first output end in parallel, wherein the first transformer and the second transformer are integrated in a first magnetic element, the first magnetic element includes a first side column, a second side column, a first central column and a second central column, the first transformer includes a first primary coil and a first secondary coil positioned on the first central column, and the second transformer includes a second primary coil and a second secondary coil positioned on the second central column, and the first central column and the second central column have a same cross sectional area.

According to another aspect of the present disclosure, an inductor-integrated magnetic element is positioned, the inductor-integrated magnetic element includes a first inductor and a second inductor which are integrated in a magnetic element, the magnetic element includes a first side column, a second side column, a first central column and a second central column, the first inductor includes a first coil, and the second inductor includes a second coil, the first coil is positioned on the first central column to form the first inductor, the second coil is positioned on the second central column to form the second inductor, the first central column and the second central column are formed with a first opening and a second opening, the first opening and the second opening form a first connection line, the first central column and the second central column form a second connection line, and the first connection line is perpendicular to or parallel with the second connection line, and the first central column and the second central column have the same cross sectional area.

According to another aspect of the present disclosure, a transformer-integrated magnetic element is provided, the transformer-integrated element includes a first transformer and a second transformer which are integrated in a magnetic element, the magnetic element includes a first side column, a second side column, a first central column and a second central column, the first transformer includes a first primary coil and a first secondary coil, and the second transformer includes a second primary coil and a second secondary coil, the first primary coil and the first secondary coil are positioned on the first central column, and the second primary coil and the second secondary coil are positioned on the second central column, The first side column and the second side column are formed with a first opening and a second opening, the first opening and the second opening form a first connection line, the first central column and the second central column form a second connection line, the first connection line is perpendicular to or parallel with the second connection line, and the first central column and the second central column have the same cross sectional area.

According to another aspect of the present disclosure, a multiple parallel-connected converter is provided, the multiple parallel-connected converter includes: a first converter having a first input end and a first output end, wherein the first converter includes a first inductor, a first transformer connected in series; and a second converter having a second input end and a second output end, wherein the second converter includes a second inductor, a second transformer connected in series, wherein the second output end is connected with the first output end in parallel and the second input end is connected with the first input end in parallel. Wherein the first transformer and the second transformer are integrated in a first magnetic element, the first magnetic element includes a first side column, a second side column, a first central column and a second central column, the first transformer includes a first primary coil and a first secondary coil positioned on the first central column, and the second transformer includes a second primary coil and a second secondary coil positioned on the second central column, and the first central column and the second central column have a same cross sectional area.

According to another aspect of the present disclosure, a multiple parallel-connected converter is provided, the multiple parallel-connected converter includes: a first converter having a first input end and a first output end, wherein the first converter includes a first inductor, a first transformer connected in series; and a second converter having a second input end and a second output end, wherein the second converter includes a second inductor, a second transformer connected in series, wherein the second output end is connected with the first output end in parallel and the second input end is connected with the first input end in parallel. Wherein the first inductor and the second inductor are integrated in a first magnetic element, the first magnetic element includes a first side column, a second side column, a first central column and a second central column, the first inductor includes a first coil, the second inductor includes a second coil, the first coil is positioned around the first central column to form the first inductor, the second coil is positioned around the second central column to form the second inductor, and the first central column and the second central column have a same cross sectional area.

The additional aspects and advantages of the present disclosure will be partly set forth in the following description, and partly become apparent from the description or learned from practice of the present disclosure.

BRIEF DESCRIPTION OF THE DRAWINGS

The above and other features and advantages of the present disclosure will become more apparent by describing exemplary embodiments thereof with reference to the attached drawings.

DETAILED DESCRIPTION

Figure 1:
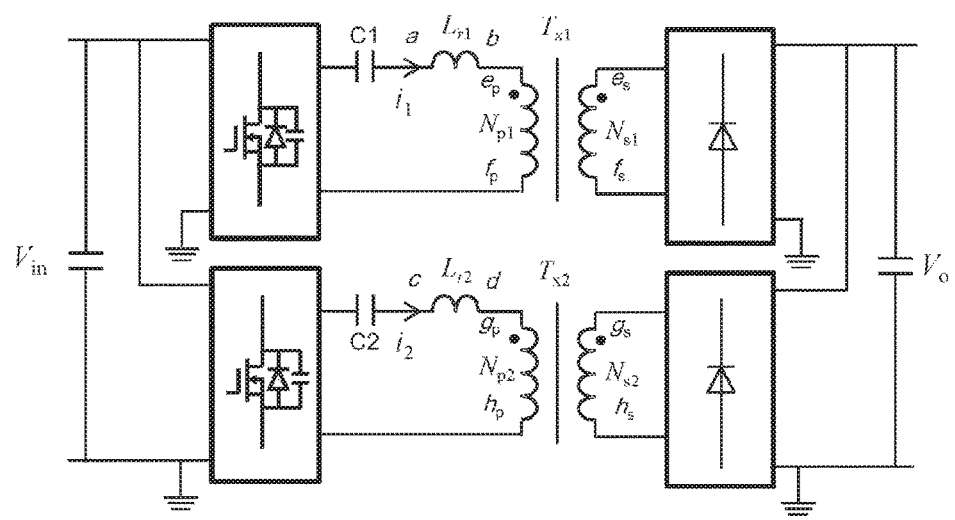
FIG. 1 shows a circuit topologic diagram of a multiple parallel-connected resonant converter according to an embodiment of the present disclosure.

Now, exemplary embodiments of the present disclosure will be more fully described with reference to the attached drawings. However, the exemplary embodiments can be implemented in various ways, and should not be construed as being limited to the embodiments set forth herein, rather, these embodiments are provided so that the present disclosure will be thorough and complete, and will fully convey the scope of the present disclosure to the person skilled in the related art. Throughout the drawings, the same reference numerals are used to refer to the same or similar structure, and thus its detail description will be omitted as necessary.

The terms "a", "an", "the", "said" and "at least one", when describing element/constituent/ or the like as described and/or shown herein, are used to express the presence of one or more the element/constitute/ or the like. The terms "include", "comprise" and "have", as used herein, are intended to be inclusive, and mean there may be additional elements/constituents/ or the like other than the listed elements/constituents/ or the like. The relativity words, such as "upper" or "lower", as used herein, are used to describe the relative relationship of the referenced component to another component. It is appreciated that if the referenced device is inversed upside down, the component indicated as being the "upper" side would become the component on the "lower" side. In addition, the words "first", "second", or the like, as used in claims, are meant to indication, but not to limit the object to which they modify.

In an embodiment of the present disclosure, a multiple parallel-connected resonant converter is used to indicate a converter formed by connecting two or more electrical branches in parallel, in which functional components having the same function in various different converters, such as inductors or transformers, are integrated into one magnetic element, thereby the volume and weight of the multiple parallel-connected resonant converter may be reduced. Since the branches have uniform electrical parameters due to the integrated magnetic element, it facilitates to simplify control circuits, optimize current sharing character of the branches, and improve efficiency of a power supply. Hereinafter, specific embodiments of the present disclosure will be described in detail by example of a multiple parallel-connected resonant converter having two branches connected in parallel.

In the present disclosure, the expression "two central columns having same cross sectional area" means the difference therebetween lies within about 10%, and for example, within about 5%. The expression "having same inductance" means the inductance difference is no more than about 10%, and for example, no more than about 5%.

Multiple Parallel-Connected Resonant Converter

With reference to FIG. 1, an embodiment of a multiple parallel-connected resonant converter according to the present disclosure includes a first converter and a second converter.

The first converter has a first input end and a first output end. The first converter includes a first inductor $L_{r1}$, a first transformer $T_{x1}$ and a first capacitor $C_1$, and the first inductor $L_{r1}$, the first transformer $T_{x1}$ and the first capacitor $C_1$ are connected in series to form a first resonant unit, a primary winding $N_{p1}$ of the first transformer has a terminal $e_p$ and a terminal $f_p$, and a secondary winding $N_{s1}$ thereof has a terminal $e_s$ and a terminal $f_s$.

The second converter has a second input end and a second output end. The second converter includes a second inductor $L_{r2}$, a second transformer $T_{x2}$ and a second capacitor $C_2$, the second inductor $L_{r2}$, the second transformer $T_{x2}$ and the second capacitor $C_2$ are connected in series to form a second resonant unit, a primary winding $N_{p2}$ of the second transformer has a terminal $g_p$ and a terminal $h_p$, and a secondary winding $N_{s2}$ thereof has a terminal $g_s$ and a terminal $h_s$.

The second output end of the second converter and the first output end of the first converter may be connected in parallel to output voltage $V_o$; and the second input end of the second converter and the first input end of the first converter may be connected in parallel to receive input voltage $V_{in}$. Of course, the second input end and the first input end may also be connected in other ways, such as in series, to receive the input voltage $V_{in}$.

In an embodiment of the multiple parallel-connected resonant converter according to the present disclosure, the first inductor $L_{r1}$ and the second inductor $L_{r2}$ are integrated in a first magnetic element, to form an inductor-integrated magnetic element; or the first transformer $T_{x1}$ and the second transformer $T_{x2}$ are integrated into a second magnetic element to form a transformer-integrated magnetic element; or the first inductor $L_{r1}$ and the second inductor $L_{r2}$ are integrated into a first magnetic element to form an inductor-integrated magnetic element, and at the same time, the first transformer $T_{x1}$ and the second transformer $T_{x2}$ are integrated into a second magnetic element, to form a transformer-integrated magnetic element.

Hereinafter, the inductor-integrated magnetic element in an embodiment of the multiple parallel-connected resonant converter according to the present disclosure will be described.

Figure 2A:
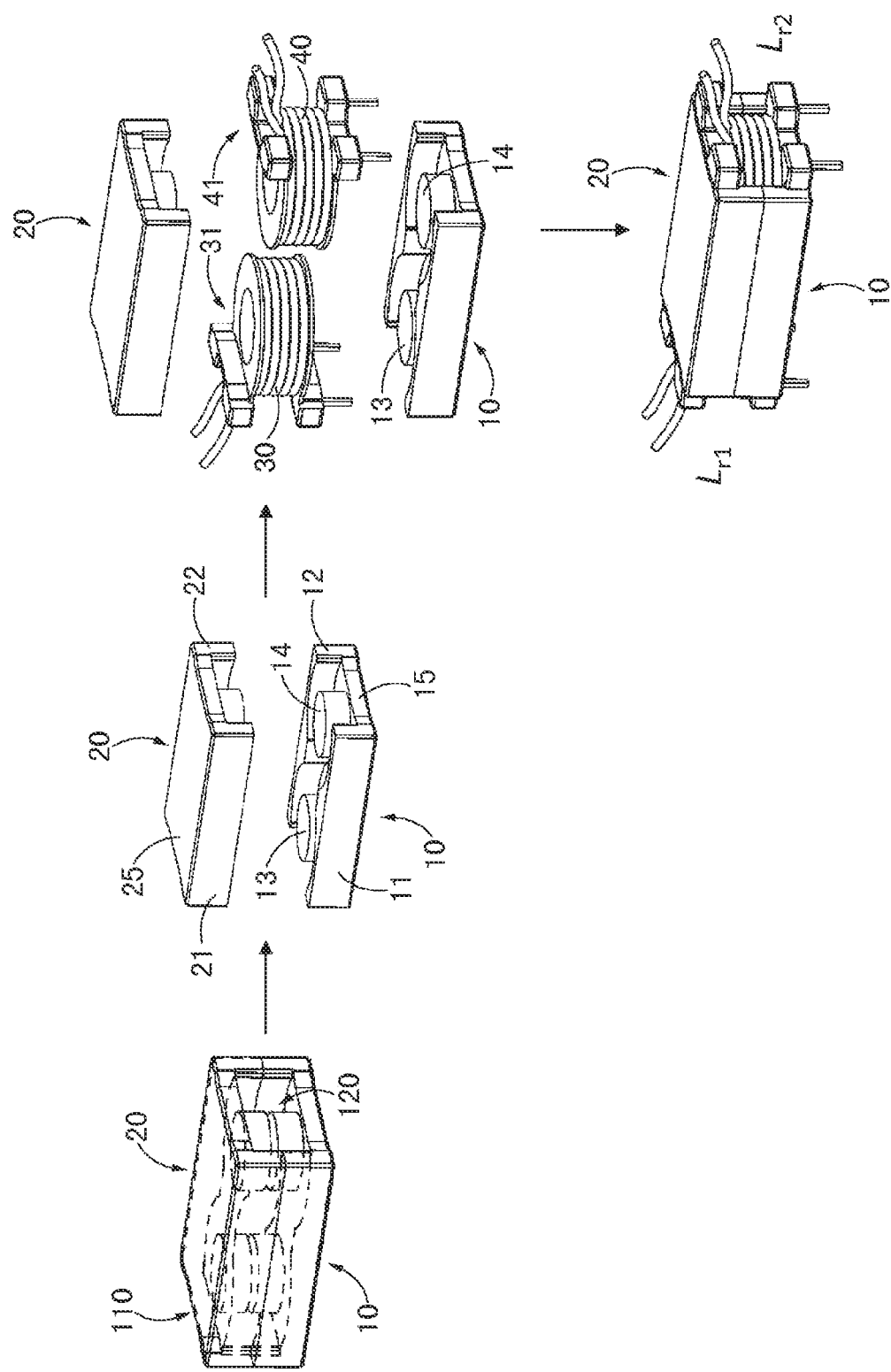
FIG. 2A is an exploded perspective diagram showing assembly process of an inductor-integrated magnetic element in a multiple parallel-connected resonant converter according to an embodiment of the present disclosure.
Figure 2B:
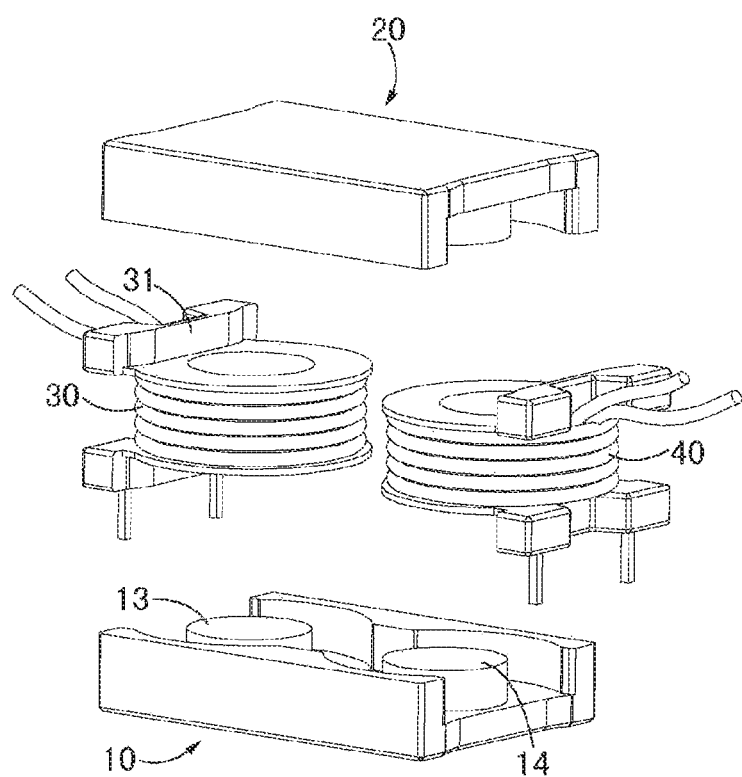
FIG. 2B shows an exploded schematic structure diagram of the inductor-integrated magnetic element as shown in FIG. 2A.

With reference to FIG. 2A and FIG. 2B, FIG. 2A is an exploded perspective diagram showing assembly process of a first inductor-integrated magnetic element in the multiple parallel-connected resonant converter according to an embodiment of the present disclosure, and FIG. 2B is an exploded schematic structure diagram showing the inductor-integrated magnetic element as shown in FIG. 2A.

The inductor-integrated magnetic element includes a first core, a first coil 30 and a second coil 40. The first core may include a first lower core 10 and a first upper core 20 having the same structure and arranged oppositely, but the present disclosure will not be limited thereby. The lower core 10 includes a first lower core cover 15, and a first lower side column 11, a second lower side column 12, a first lower central column 13 and a second lower central column 14 connected with the first lower core cover 15. The first lower central column 13 and the second lower central column 14 may be located between the first lower side column 11 and the second lower side column 12, but the present disclosure will not be limited thereby.

Figure 2C:
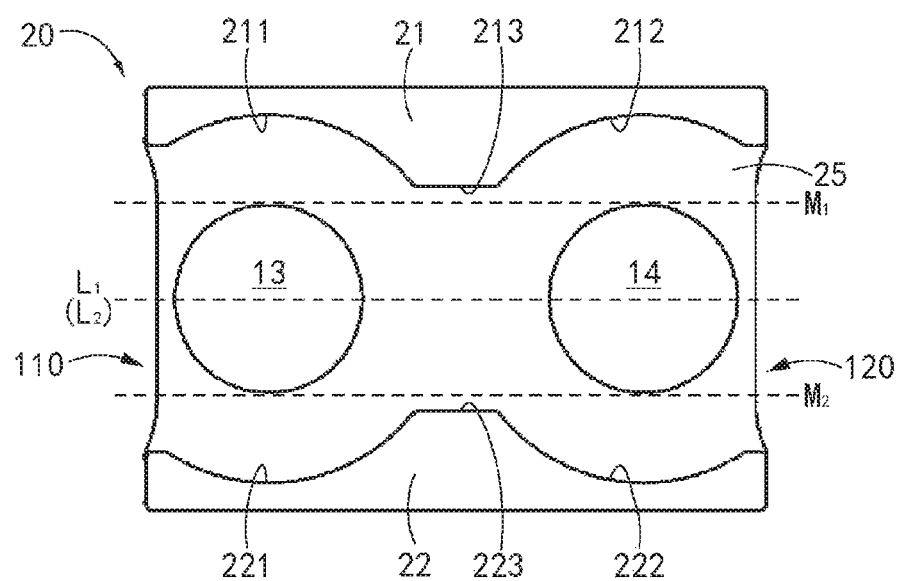
FIG. 2C is a schematic diagram showing positional relationship between two central columns and two openings in the inductor-integrated magnetic element as shown in FIG. 2A.

The first upper core 20 includes a first upper core cover 25, and a first upper side column 21, a second upper side column 22, a first upper central column and a second upper central column connected with the first upper core cover 25, as shown in FIG. 2C. The first upper central column and the second upper central column may be located between the first upper side column and the second upper side column, but the present disclosure will not be limited thereby.

The first lower side column 11, the second lower side column 12, the first lower central column 13 and the second lower central column 14 are abutted with or adjacent with the first upper side column 21, the second upper side column 22, the first upper central column and the second upper central column in one by one correspondence, but the present disclosure will not be limited thereby. The first lower side column 11 may form a first side column together with the first upper side column 21; the second lower side column 12 may form a second side column together with the second upper side column 22; the first lower central column 13 may form a first central column together with the first upper central column, wherein there may be an gap positioned between the first lower central column 13 and the first upper central column; the second lower central column 14 may form a second central column together with the second upper central column, and there may be a gap positioned between the second lower central column 14 and the second upper central column, but the present disclosure will not be limited thereby, for example, the gaps may not be provided.

In the multiple parallel-connected resonant converter according to an embodiment of the present disclosure, the first lower central column 13, the first upper central column facing the first lower central column 13, the second lower central column 14 and the second upper central column facing the second lower central column 14 may have the same cross sectional area; the two central columns may be aligned and arranged symmetrically. When the gaps are needed to be ground on the two central columns, they may be ground in the same direction at the same time, by which it may be guaranteed that the gaps may be consistently ground on the two central columns, by which difference between inductance of the two inductors may be effectively reduced, and the inductance difference may be reduced to 3% (inclusive) or less, compared with 10% of the difference in the conventional split inductors. It will be helpful to keep the resonant parameters of the multiple parallel-connected resonant converter according to an embodiment of the present disclosure in uniform characteristics, facilitate current sharing between the two circuits, improve the efficiency of a power supply, and be helpful to simplify a control circuit at the same time.

It should be appreciated that the description on the first core is only illustrative, and will not construct limitation on the present disclosure, and a magnetic element with other structure may also be equally applied into the present disclosure. The first inductor $L_{r1}$ includes a first coil 30, the first coil 30 is positioned on the first central column to form the first inductor $L_{r1}$. Wherein the first coil 30 may be formed by winding enameled wire along a direction, the first coil 30 may be directly positioned on the first central column, or may be wound on a first bobbin 31, and then the first bobbin 31 is positioned over the first central column, the present disclosure will not be limited thereby. The first coil is not limited to the enameled wire, and may be in other material structure or type, such as copper foils, or the like.

The second inductor $L_{r2}$ includes a second coil 40, the second coil 40 is positioned on the second central column to form the second inductor $L_{r2}$. Wherein the second coil 40 may be formed by winding enameled wire along a direction, the second coil 40 may be directly wound on the second central column, or may be wound on a second bobbin 41 and then the second bobbin 41 is positioned over the second central column, but the present disclosure is not limited thereby. The second coil 40 is not limited to the enameled wire, and may also be in other material structure or type, such as copper foils, or the like.

In the multiple parallel-connected resonant converter according to the present embodiment, the first inductor $L_{r1}$ and the second inductor $L_{r2}$ are integrated on the first core, and the two inductors share the side columns and the core cover of the first core, by which it is possible to effectively reduce the overall volume and weight of the magnetic element integrated with the first inductor $L_{r1}$ and the second inductor $L_{r2}$. The first central column and the second central column may have the same cross sectional area, to achieve the same inductance between the first inductor $L_{r1}$ and the second inductor $L_{r2}$.

Figure 2D:
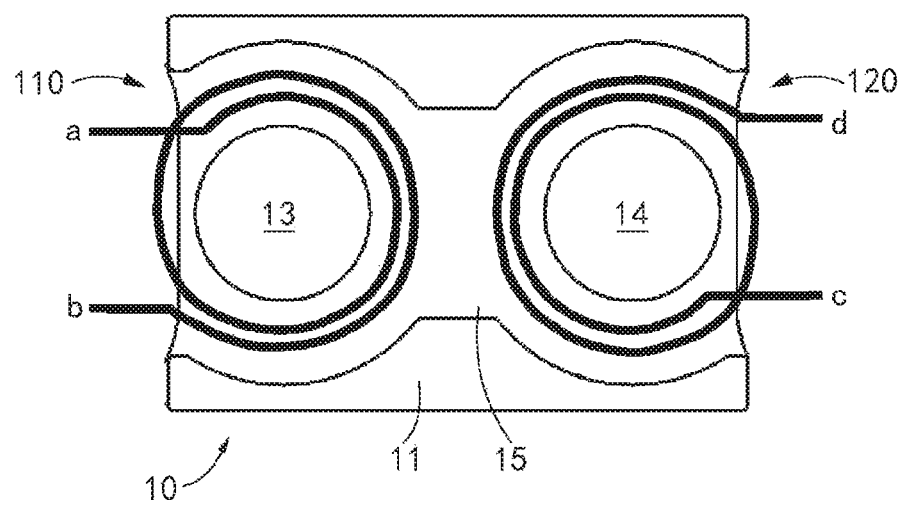
FIG. 2D is a schematic diagram showing winding directions of two coils in the inductor-integrated magnetic element as shown in FIG. 2A.

With reference to FIG. 2C and FIG. 2D, FIG. 2C is a schematic diagram showing a first positional relationship between the two central columns and two openings in the inductor-integrated magnetic element as shown in FIG. 2A, FIG. 2D is a schematic diagram showing winding directions in which the two coils are wound in the inductor-integrated magnetic element as shown in FIG. 2A. As shown in FIG. 2C, the first side column (refer to the first upper side column 21) and the second side column (refer to the second upper side column 22) form a first opening 110 and a second opening 120. A first connection line $L_1$ may be drawn by connecting a center of the first opening 110 with a center of the second opening 120, a second connection line $L_2$ may be drawn by connecting centers of the first central column (refer to the first lower central column 13) and the second central column (refer to the second lower central column 14), but the present disclosure will not be limited thereby, for example, the first connection line $L_1$ and the second connection line $L_2$ may also be formed by connecting two points other than the centers. A side of the first side column (refer to the first upper side column 21) towards the first central column and the second central column is provided with a first arc side 211 and a second arc side 212, and a first platform 213 may be provided at intersection position between the first arc side 211 and the second arc side 212. A side of the second side column (refer to the second upper side column 22) towards the first central column and the second central column is provided with a third arc side 221 and a fourth arc side 222, and a second platform 223 is provided at intersection position between the third arc side 221 and the fourth arc side 222. The first central column (refer to the first lower central column 13) and the second central column (refer to the second lower central column 14) may be in circular or oval shape, and a first external common tangent line $M_1$ and a second external common tangent line $M_2$ are drawn according to the first central column and the second central column. In this embodiment as shown in FIG. 2C, there is no intersection point between the first arc side 211, the second arc side 212, the third arc side 221, the fourth arc side 222, the first external common tangent line $M_1$ and the second external common tangent line $M_2$. In the embodiment as shown in FIG. 2C, the first connection line $L_1$ is parallel with (including coincide with) the second connection line $L_2$, but the present disclosure is not limited thereby, and the first connection line $L_1$ and the second connection line $L_2$ are not limited to be parallel with each other, and it is applicable that the two lines are perpendicular to each other or intersected with each other, that is, in other embodiments, the first connection line $L_1$ and the second connection line $L_2$ may be parallel with each other, perpendicular to each other or form a certain angle.

Figure 4:
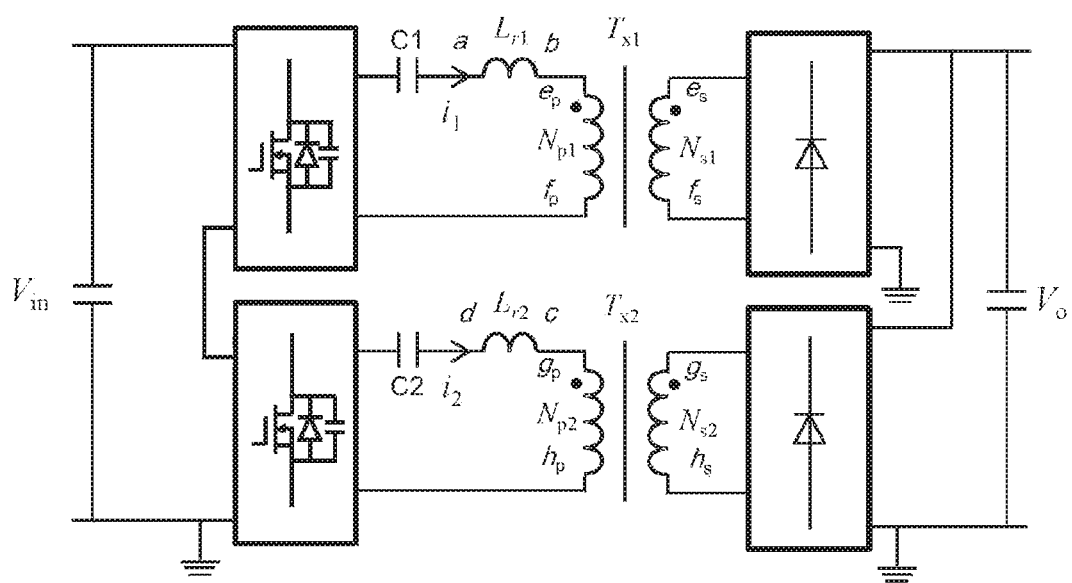
FIG. 4 shows a circuit topologic diagram of a multiple parallel-connected resonant converter according to another embodiment of the present disclosure.

In connection with FIG. 1, FIG. 2D and FIG. 4, the winding directions of the two coils in the inductor-integrated magnetic element are the same or opposite. When the input ends of the converters are connected in series, the magnetic fields formed by coils of the converters are the same or different by an angle of about 180 degree. One of the coils has a first leading out terminal a and a second leading out terminal b, and its winding direction may be defined as starting from the first leading out terminal a and ending at the second leading out terminal b. The other coil has a first leading out terminal c and a second leading out terminal d, and its winding direction may be defined as starting from the first leading out terminal c and ending at the second leading out terminal d. The four leading out terminals of the two coils may be located with respect to the openings in various combinations, for example, any two of the leading out terminals may be located at one opening, and the remaining two leading out terminals may be located at another opening; alternatively, the four leading out terminals are all located at the same one opening. By setting current in the two coils, magnetic fields formed by the two coils may be in opposite directions at the same time, but the present disclosure is not limited thereby, and also may be in the same directions.

In an embodiment of the multiple parallel-connected resonant converter of the present disclosure, when the input ends of the converters are connected in parallel, the first inductor and the second inductor are operated at the same time, and in operation time sequence, they are different from each other by an angle, e.g. about 90 degree when the number of the branches are 2, that is 90 degree equals 180/2, to reduce the magnetic density and reduce the ripples of the currents. When the number of the branches are N, the magnetic fields formed by the N coils are different by an angle of 180/N. For magnetic flux distribution in the first magnetic element, the two central columns are operated independently, and there is no coupling influence therebetween. In an embodiment, the two side columns and the two core covers of the first magnetic element are commonly used by the two inductors, and since the two inductor are operated with the time sequence thereof being staggered about 90 degree, thus, the magnetic flux of the two side columns and the magnetic flux of the two core cover are partly offset. Thus, the size and the weight of the side columns and the core covers may be reduced with loss of the first magnetic element being kept unchanged, or the loss of the first magnetic element may be reduced with the volume being constant. But the present disclosure is not limited thereby, for example, the operation time sequences of the first inductor and the second inductor may be staggered by about 180 degree, or the like, or the operation time sequence of the first inductor and the second inductor may be the same, and so on.

Hereinafter, a transformer-integrated magnetic element in an embodiment of a multiple parallel-connected resonant converter according to the present disclosure will be described.

Figure 3A:
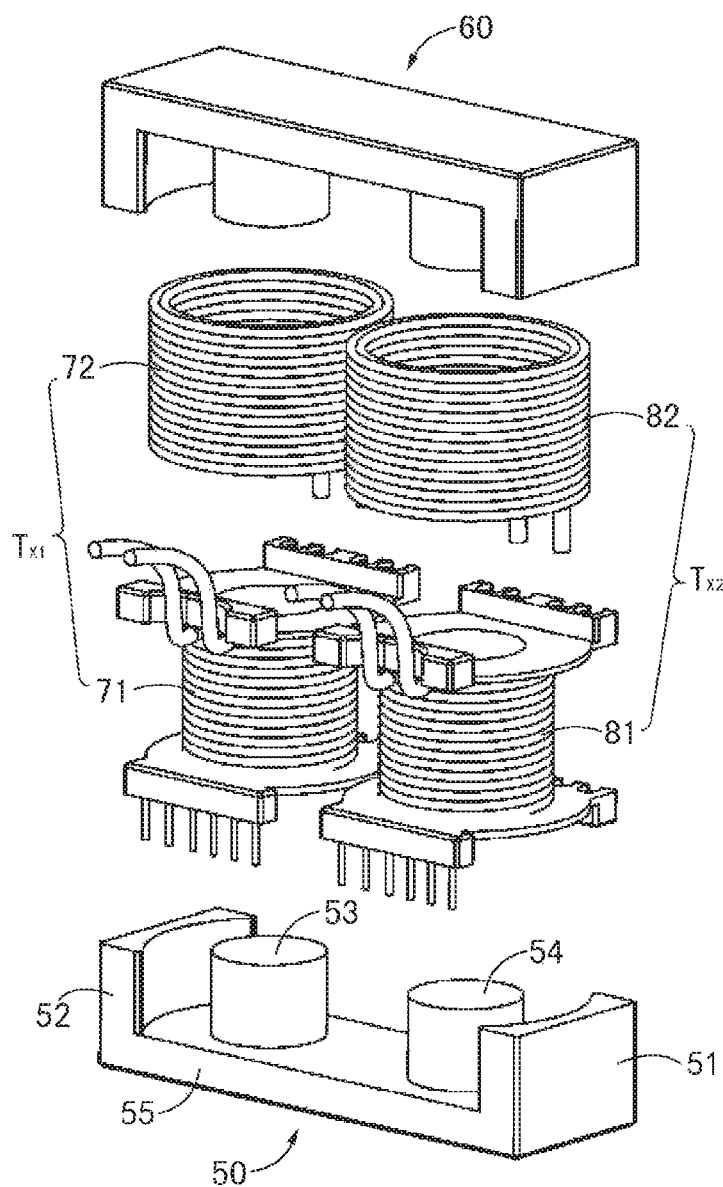
FIG. 3A is an exploded perspective diagram showing a transformer-integrated magnetic element in a multiple parallel-connected resonant converter according to an embodiment of the present disclosure.
Figure 3B:
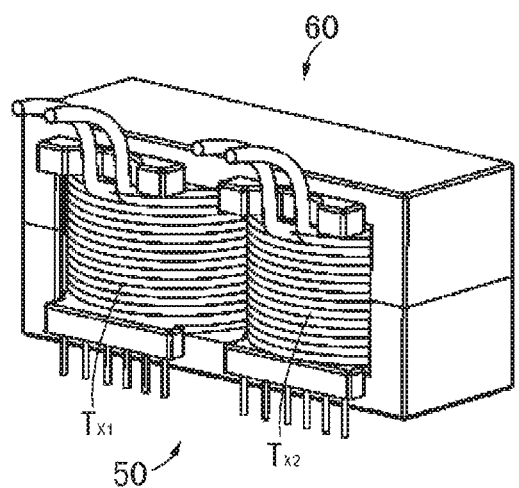
FIG. 3B is an assembled diagram showing the transformer-integrated magnetic element as shown in FIG. 3A.

With reference to FIG. 3A and FIG. 3B, FIG. 3A is an exploded perspective diagram showing a transformer-integrated magnetic element in a multiple parallel-connected resonant converter according to an embodiment of the present disclosure, and FIG. 3B shows its assembled diagram. The transformer-integrated magnetic element includes a second magnetic element integrated with a first transformer $T_{x1}$ and a second transformer $T_{x2}$. The second magnetic element may include a second lower core 50 and a second upper core 60 which have the same structure and are arranged oppositely. The second lower core 50 includes a second lower core cover 55, and a third lower side column 51, a fourth lower side column 52, a third lower central column 53 and a fourth lower central column 54 connected with the second lower core cover 55. The two side columns may have arc sides.

The first transformer $T_{x1}$ may include one or more first primary coil 71 and one or more first secondary coil 72, the first primary coil 71 and the first secondary coil 72 are positioned around the third central column, to form the first transformer $T_{x1}$. The second transformer $T_{x2}$ may include one or more second primary coil 81 and one or more second secondary coil 82, the second primary coil 81 and the second secondary coil 82 are positioned around the fourth central column to form the second transformer $T_{x2}$. The first primary coil 71 and the first secondary coil 72, as well as the second primary coil 81 and the second secondary coil 82 may be formed by winding enameled wires or triple insulated wires, but the present disclosure will not be limited thereby. The first primary coil 71 and the first secondary coil 72 may be wound on a bobbin, and the second primary coil 81 and the second secondary coil 82 may be wound on another bobbin, then the two bobbins are respectively mounted on the third central column and the fourth central column to form the transformer-integrated magnetic element. By setting current in the two primary coils, magnetic fields generated by the respective primary coils may be made to be in opposite direction, but the present disclosure will not be limited thereby, and the magnetic fields may also be in the same direction.

In an embodiment, the core in the transformer-integrated magnetic element may also employ the core in the above described inductor-integrated magnetic element, but the present disclosure is not limited thereby.

In the present embodiment, the first transformer $T_{x1}$ has four leading out terminals, that is, two leading out terminals for the first primary coil 71 and two leading out terminals for the first secondary coil 72, these four leading out terminals are all located at the third opening or the fourth opening, or may also be respectively located at the third opening and the fourth opening. The second transformer $T_{x2}$ has four leading out terminals, and these four leading out terminals are all located at the third opening or the fourth opening, or may also be respectively located at the third opening and the fourth opening.

In the embodiment of the multiple parallel-connected resonant converter according to the present disclosure, when the input ends of the converters are connected in parallel, its electrical operation character is that the two primary windings are operated with the time sequence thereof being different from each other by an angle, e.g. about 90 degree when the number of the branches are 2, that is 90 degree equals 180/2, so as to form a staggered parallel transformer and thus reduce the magnetic flux density and further reduce the ripples of the currents when the transformer is used in the said converter. When the number of the branches are N, the magnetic fields formed by the N primary windings are different by an angle of 180/N. In an embodiment, for magnetic flux distribution in the second magnetic element, the two central columns are decoupled from each other, and are operated independently, but the present disclosure is not limited thereby. The two side columns and the two core covers of the second magnetic element may be commonly used by the two transformers, and since the two primary windings are operated with the time sequence thereof being staggered by about 90 degree, the magnetic flux from the two side columns and the core cover will partly offset, thus, the size and the weight of the side columns and the core covers may be reduced with the loss of the second magnetic element being kept unchanged, or the loss of the second magnetic element may be reduced with the volume thereof being kept unchanged. But the present disclosure will not be limited thereby, for example, the operation time sequence of the two primary windings may be staggered by about 180 degree, or the like, or the two primary windings may also be operation at the same time sequence, etc.

It is appreciated that the present disclosure is not limited to the resonant converter with two parallel transformers, and more than two transformers, such as three, five, or the like may also be applied.

The multiple parallel-connected resonant converter, as described herein, may only employ the inductor-integrated magnetic element, or only employ the transformer-integrated magnetic element, or employ both the inductor-integrated magnetic element and the transformer-integrated magnetic element at the same time, the present disclosure would not be limited thereby. As described herein, the core in the inductor-integrated magnetic element may also be used in the transformer-integrated magnetic element, and the core in the transformer-integrated magnetic element may also be used in the inductor-integrated magnetic element, the present disclosure is not limited thereby.

In the multiple parallel-connected resonant converter according to the present disclosure, the first inductor of the first converter and the second inductor of the second converter are integrated in the first magnetic element, so that the same one magnetic element may be commonly used by two or more inductors, thus volume and weight of the multiple parallel-connected resonant converter may be effectively decreased. Likewise, in the multiple parallel-connected resonant converter, the first transformer of the first converter and the second transformer of the second converter are integrated in the second magnetic element, so that the same one magnetic element may be commonly used by two or more transformers, thus volume and weight of the multiple parallel-connected resonant converter may be decreased. By decreasing the volume of the multiple parallel-connected resonant converter and reducing the weight, it is facilitated to improve the power density of the power supply.

However, the present disclosure is not limited to resonant converter. For example, in a parallel-connected converter, a first converter having a first input end and a first output end may include a first inductor and a first transformer connected in series, and a second converter having a second input end and a second output end may include a second inductor, a second transformer connected in series. The second output end is connected with the first output end in parallel and the second input end is connected with the first input end in parallel. The first transformer and the second transformer are integrated in a first magnetic element. The first magnetic element includes a first side column, a second side column, a first central column and a second central column. The first transformer includes a first primary coil and a first secondary coil positioned on the first central column, and the second transformer includes a second primary coil and a second secondary coil positioned on the second central column. The first central column and the second central column have a same cross sectional area. Magnetic fields generated by the first primary coil and the second primary coil may be different by an angle of about 90 degree in time sequence.

In another example, in a parallel-connected converter, a first converter having a first input end and a first output end may include a first inductor and a first transformer connected in series, and a second converter having a second input end and a second output end may include a second inductor, a second transformer connected in series. The second output end is connected with the first output end in parallel and the second input end is connected with the first input end in parallel. The first inductor and the second inductor are integrated in a first magnetic element. The first magnetic element comprises a first side column, a second side column, a first central column and a second central column. The first inductor includes a first coil, and the second inductor includes a second coil. The first coil is positioned around the first central column to form the first inductor, and the second coil is positioned around the second central column to form the second inductor, and the first central column and the second central column have a same cross sectional area. Magnetic fields formed by the first coil and the second coil may be different by an angle of about 90 degree in time sequence.

The Inductor-Integrated Magnetic Element

With reference to FIG. 2A to FIG. 2D, the inductor-integrated magnetic element in the embodiment of the present disclosure substantially has the same structure as the inductor-integrated magnetic element used in the multiple parallel-connected resonant converter according the embodiment of the present disclosure, and thus will not be further described herein. The core shown in FIG. 3A to FIG. 3B may also be used in the inductor-integrated magnetic element.

It is noted that the inductor-integrated magnetic element not only may be used in a multiple parallel-connected resonant converter, but also may be used in other power supply circuit, for example, used in dual or multiple Buck circuit (chopper buck circuit), Boost circuit (voltage-increasing circuit), or a Boost PFC circuit (boost power factor correction circuit), or the like.

Transformer-Integrated Magnetic Element

With reference to FIG. 3A to FIG. 3B, the transformer-integrated magnetic element in this embodiment of the disclosure may substantially have the same structure as the transformer-integrated magnetic element used in the multiple parallel-connected resonant converter according to the embodiment of the present disclosure, and thus will not further described herein. The core shown in FIG. 2A to FIG. 2d may also be used in the transformer-integrated magnetic element.

It is noted that the transformer-integrated magnetic element not only can be used in the multiple parallel-connected resonant converter, but also can be used in other power supply circuit, for example, can be used in dual or multiple forward-type converter, phase shifted full bridge converter, flyback converter or the like.

The exemplary embodiments of the present disclosure has been shown and described above. It should be understood that the present disclosure would never be limited to the disclosed embodiments, rather, the present disclosure is intended to cover various modification and equivalent arrangement fallen within the spirit and scope of the attached claims.

What is claimed is:

1. A multiple parallel-connected resonant converter, comprising:
   a first converter having a first input end and a first output end, wherein the first converter comprises a first inductor, a first transformer and a first capacitor, and the first inductor, the first transformer and the first capacitor are connected in series to form a first resonant unit; and
   a second converter having a second input end and a second output end, wherein the second converter comprises a second inductor, a second transformer and a second capacitor, the second inductor, the second transformer and the second capacitor are connected in series to form a second resonant unit, and the second output end is connected with the first output end in parallel,
   wherein the first inductor and the second inductor are integrated in a first magnetic element, the first magnetic element comprises a first side column, a second side column and only two central columns, wherein the two central columns are a first central column and a second central column, the first inductor comprises a first coil, the second inductor comprises a second coil, the first coil is positioned around the first central column to form the first inductor, the second coil is positioned around the second central column to form the second inductor, and the first central column and the second central column have a same cross sectional area,
   wherein the first input end of the first converter is connected with the second input end of the second converter in series, magnetic fields formed by the first coil and the second coil are in opposite directions at the same time.

2. The multiple parallel-connected resonant converter according to claim 1, wherein the first side column and the second side column are formed with a first opening and a second opening, the first opening and the second opening form a first connection line, the first central column and the second central column form a second connection line, and the first connection line is perpendicular to or parallel with the second connection line.

3. The multiple parallel-connected resonant converter according to claim 1, wherein a side of the first side column towards the first central column and the second central column has a first arc side and a second arc side, a side of the second side column towards the first central column and the second central column has a third arc side and a fourth arc side, the first central column and the second central column are in circular or oval shape, the first central column and the second central column form a first external common tangent line and a second external common tangent line, and there are not any intersection points between a group of the first arc side, the second arc side, the third arc side and the fourth arc side, and a group of the first external common tangent line and the second external common tangent line.

4. A multiple parallel-connected resonant converter, comprising:
   a first converter having a first input end and a first output end, wherein the first converter comprises a first inductor, a first transformer and a first capacitor, and the first inductor, the first transformer and the first capacitor are connected in series to form a first resonant unit; and
   a second converter having a second input end and a second output end, wherein the second converter comprises a second inductor, a second transformer and a second capacitor, the second inductor, the second transformer and the second capacitor are connected in series to form a second resonant unit, and the second output end is connected with the first output end in parallel,
   wherein the first transformer and the second transformer are integrated in a first magnetic element, the first magnetic element comprises a first side column, a second side column and only two central columns, wherein the two central columns are a first central column and a second central column, the first transformer comprises a first primary coil and a first secondary coil positioned on the first central column, and the second transformer comprises a second primary coil and a second secondary coil positioned on the second central column, and the first central column and the second central column have a same cross sectional area, wherein the first input end of the first converter is connected with the second input end of the second converter in series, magnetic fields formed by the first primary coil and the second primary coil are in opposite directions at the same time.

5. The multiple parallel-connected resonant converter according to claim 4, wherein the first side column and the second side column are formed with a first opening and a second opening, the first opening and the second opening form a first connection line, the first central column and the second central column form a second connection line, and the first connection line is perpendicular to or parallel with the second connection line.

6. The multiple parallel-connected resonant converter according to claim 5, wherein a side of the first side column towards the first central column and the second central column has a first arc side and a second arc side, a side of the second side column towards the first central column and the second central column has a third arc side and a fourth arc side, the first central column and the second central column are in circular or oval shape, the first central column and the second central column form a first external common tangent line and a second external common tangent line, and there are not any intersection points between a group of the first arc side, the second arc side, the third arc side and the fourth arc side, and a group of the first external common tangent line and the second external common tangent line.

* * * * *